US009569207B2

(12) United States Patent
Km et al.

(10) Patent No.: US 9,569,207 B2
(45) Date of Patent: Feb. 14, 2017

(54) SOURCE CODE FLOW ANALYSIS USING INFORMATION RETRIEVAL

(71) Applicant: ACCENTURE GLOBAL SERVICES LIMITED, Dublin (IE)

(72) Inventors: Annervaz Km, Bangalore (IN); Vikrant Shyamkant Kaulgud, Pune (IN); Shubhashis Sengupta, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/271,943

(22) Filed: May 7, 2014

(65) Prior Publication Data

US 2014/0337820 A1 Nov. 13, 2014

(30) Foreign Application Priority Data

May 8, 2013 (IN) .......................... 2053/CHE/2013

(51) Int. Cl.
*G06F 9/44* (2006.01)
*G06F 9/45* (2006.01)

(52) U.S. Cl.
CPC ................. *G06F 8/73* (2013.01); *G06F 8/433* (2013.01)

(58) Field of Classification Search
CPC .................................... G06F 8/73; G06F 8/433
See application file for complete search history.

(56) References Cited

U.S. PATENT DOCUMENTS

| 2007/0239993 A1* | 10/2007 | Sokolsky | G06F 21/563 713/188 |
| 2012/0062574 A1* | 3/2012 | Dhoolia | G06K 9/00476 345/506 |
| 2013/0198725 A1* | 8/2013 | Chou et al. | 717/132 |
| 2014/0115558 A1* | 4/2014 | Dhoolia et al. | 717/104 |

OTHER PUBLICATIONS

Sutton et al: "Recovering UML class models from C++: A detailed explanation", Information and Software Technology, Elsevier, Amsterdam, NL, vol. 49, No. 3, Jan. 26, 2007, pp. 212-229.
European Patent Office, "The extended European search report" on EP Patent Application No. 14167235.2, dated Oct. 7, 2014, 8 pages.

* cited by examiner

*Primary Examiner* — Li B Zhen
*Assistant Examiner* — Amir Soltanzadeh
(74) *Attorney, Agent, or Firm* — Mannava & Kang, P.C.

(57) ABSTRACT

According to an example, source code flow analysis may include receiving source code for an application, and identifying virtual flow documents for the application from the source code. The virtual flow documents may represent ordered sequences of method calls for the application. The source code flow analysis may further include extracting features of the virtual flow documents, determining similarity between the virtual flow documents by estimating similarities for the extracted features to determine a flow-to-flow similarity, and clustering the virtual flow documents based on the flow-to-flow similarity. The flow-to-flow similarity may be further used, for example, to generate highest priority virtual flow documents and methods for the source code. The source code flow analysis may also include determination of flow-to-maintenance activity description (MAD) similarity, for example, to identify relevant virtual flow documents from the virtual flow documents based on the flow-to-MAD similarity to generate ordered relevant virtual flow documents.

20 Claims, 11 Drawing Sheets

- Let C1= InvoiceGenerator
  - f1A = GenerateInvoice(InvoiceType type, DataSourceName source)
- Let C2= InvoiceDataCollector
  - f2A = CollectAuditBookData(ServerIP ip, AuditBookDetails details)
  - f2B = CollectEnteredMannualData(DataBase name, ServerIP ip, DataBaseTable tableName)
  - f2C = CollectOnlineData(Date fromDate, Date toDate)
- Let C3= InvoiceDataChecker
  - f3A = ParseAuditData(Data data)
  - f3B = ValidateData(Data data)
  - f3C = ParseData(Data data)
- Let C4= InvoiceClassifier
  - f4A = ClassifyAuditBookData(Data data)
  - f4B = ClassifyOtherData(Data data)
  - f4C = ComputeStatistics(Data data)
- Let C5= InvoicePrinter
  - f5A = PrintInvoice(Invoice invoice)
  - f5B = TypeSetInvioce(Invoice invoice, Style styleName)
  - f5C = SendStreamToPrinter(DataStream stream)

FIG. 5A

|       | Flow1 | Flow2 | Flow3 | Flow4 | Flow5 |
|-------|-------|-------|-------|-------|-------|
| Flow1 | 1     | :     | :     | :     | :     |
| Flow2 | :     | 1     | 0.103 | :     | :     |
| Flow3 | :     | 0.103 | 1     | :     | :     |
| Flow4 | :     | :     | :     | 1     | :     |
| Flow5 | :     | :     | :     | :     | 1     |

FIG. 7

|      | Flow1 | Flow2 | Flow3 | Flow4 | Flow5 |
|------|-------|-------|-------|-------|-------|
| MAD1 | :     | :     | :     | :     | :     |
| MAD2 | :     | 0.63  | :     | :     | :     |

FIG. 8

SOURCE CODE FLOW ANALYSIS USING INFORMATION RETRIEVAL

CROSS-REFERENCE TO RELATED APPLICATION(S)

This application claims the benefit of Indian patent application Serial Number 2053/CHE/2013, filed May 8, 2013, which is expressly incorporated herein by reference.

BACKGROUND

When working on software maintenance activities for an application, a user may identify parts of the application source code and explore the source code, for example, to modify the source code to add new features, or to identify the cause of a software defect. For example, the user may attempt to comprehend an application by understanding the structure of the application in terms of classes in the application. The classes may represent data types that include a group of objects with the same properties and behaviors, and that are arranged in a hierarchy with other such data types. However, depending on the expertise of the user, comprehension of an application can be challenging based on an analysis that is limited to the application classes.

BRIEF DESCRIPTION OF DRAWINGS

Features of the present disclosure are illustrated by way of examples shown in the following figures. In the following figures, like numerals indicate like elements, in which:

FIG. 5A illustrates classes and functions for the method interaction graph of FIG. 4, according to an example of the present disclosure;

FIG. 7 illustrates a flow-flow matrix, according to an example of the present disclosure;

FIG. 8 illustrates a maintenance activity detail (MAD)-flow matrix, according to an example of the present disclosure;

DETAILED DESCRIPTION

Figure 1:
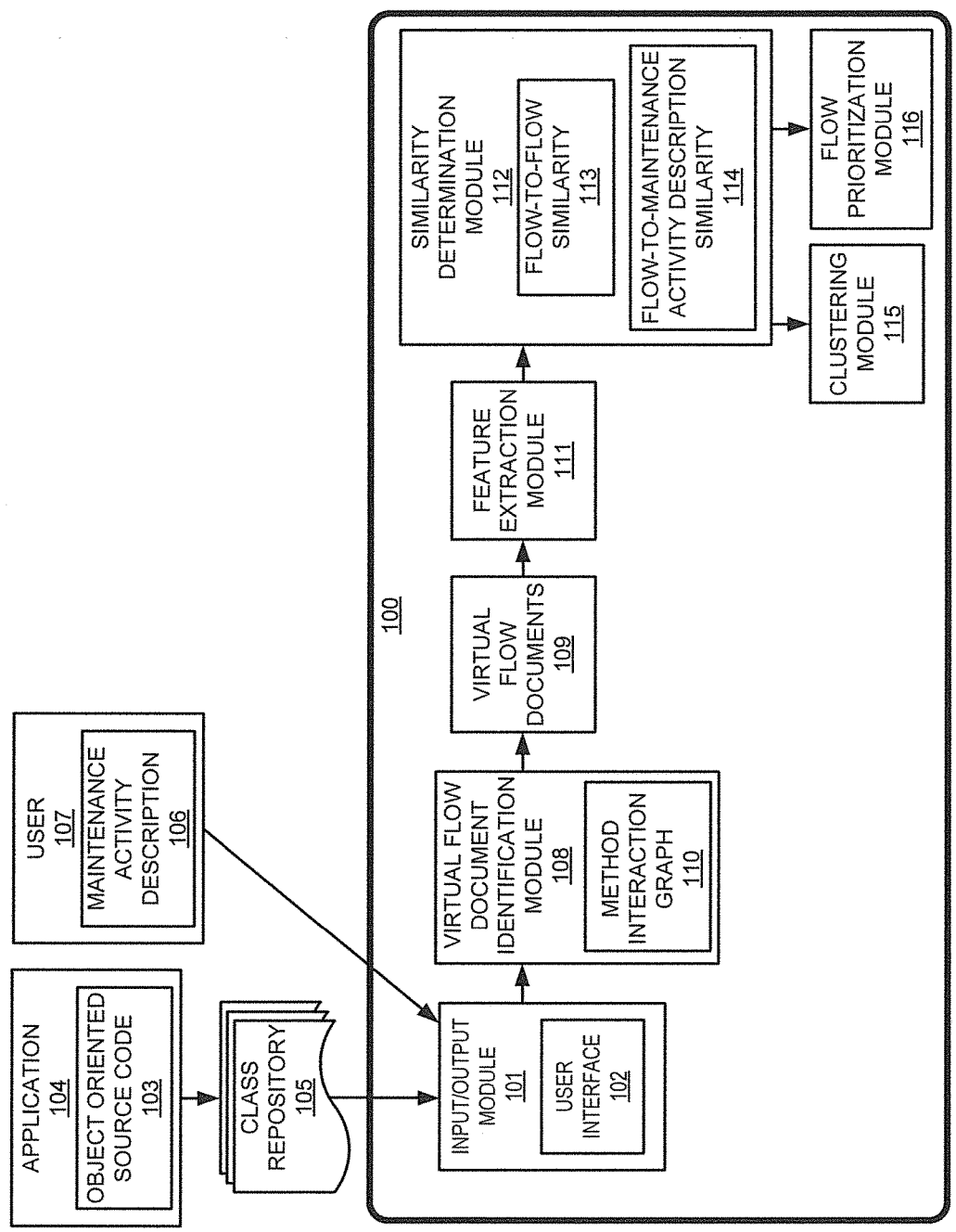
FIG. 1 illustrates an architecture of a source code flow analysis system, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

When working on software maintenance activities, identification of a flow or a sequence of calls may facilitate identification of a potential cause of a defect. Similarly, for general comprehension of an application, the flow may provide a context in which the application is working. With respect to an application, a flow may represent a sequence of method calls that are executed as a result of a user's interaction with the application. Flow identification may be dynamic (i.e., at runtime, using instrumentation) or static (i.e., using source code analysis).

According to an example, a source code flow analysis system and a method for source code flow analysis are disclosed herein. The system and method disclosed herein may generally provide for identification and ordering (i.e., prioritization) of flows (i.e., sequence of method calls). The identified flows may be used by a developer to inspect an application to fix a defect or to carry out a maintenance activity. The system and method disclosed herein may also provide for the identification of other relevant artifacts, such as methods and classes/files, for example, for performing maintenance activities. The classes/files may also be prioritized in the order of importance. The system and method disclosed herein may also use grouping (i.e., clustering) of flows in source code to identify the coherent source code units in an application, for example, to facilitate program comprehension and maintenance activities. Further, the system and method disclosed herein may provide for identification of the most important flows in source code, for example, to prioritize and focus on when performing source code transition activities.

For the system and method disclosed herein, a multi-dimensional view of the information available in a source code base may be used to determine, cluster, and prioritize flows, for example, for application comprehension and/or for performance of maintenance activities. For example, source code elements may be characterized in terms of comprehensive sets of features related to source code elements and their inter-dependencies. Linguistic features may be used to capture the implicit assumptions and intentions of source code designers. Further, programming features may be used to capture concepts embedded into identifier names and conditional statements. For the system and method disclosed herein, similarity measures may be defined as per the type and quality of the extracted features. The system and method disclosed herein may use the static profile of source code, with or without input related to run-time information of source code execution. The clustering based on flows may provide a run-time perspective of the source code. The analysis performed by the system and method disclosed herein may be limited to utilization of static information of the source code.

According to an example, the source code flow analysis system may include a memory storing machine readable instructions to receive source code for an application, and identify virtual flow documents for the application from the source code. The virtual flow documents may represent ordered sequences of method calls for the application. The source code flow analysis system may further include the memory storing machine readable instructions to extract features of the virtual flow documents, determine similarity between the virtual flow documents by estimating similarities for the extracted features to determine a flow-to-flow similarity, and cluster the virtual flow documents based on the flow-to-flow similarity to facilitate identification of a cause of a defect related to the application. The source code flow analysis system may further include a processor to implement the machine readable instructions.

According to another example, the source code flow analysis system may include the memory storing machine readable instructions to receive source code for an application, receive a maintenance activity description (MAD) for a maintenance activity to be performed on the application, and identify virtual flow documents for the application from the source code. The source code flow analysis system may further include the memory storing machine readable instructions to extract features of the virtual flow documents, determine similarity between the virtual flow documents and the MAD by estimating similarities for the extracted features and the MAD to determine a flow-to-MAD similarity, and identify relevant virtual flow documents from the virtual flow documents based on the flow-to-MAD similarity to generate ordered relevant virtual flow documents to facilitate performance of the maintenance activity on the application.

The system and method disclosed herein provide a technical solution to the technical problem of source code analysis, for example, for an application. In many instances, manual analysis of the structure of an application in terms of classes in the application, and the variability involved therewith, can lead to limited comprehension of the application. The system and method disclosed herein provide the technical solution of objectively identifying virtual flow documents for an application from the source code for the application. The virtual flow documents may represent ordered sequences of method calls for the application. The system and method disclosed herein provide the technical solution of extracting features of the virtual flow documents, determining similarity between the virtual flow documents by estimating similarities for the extracted features to determine a flow-to-flow similarity, clustering the virtual flow documents based on the flow-to-flow similarity, and using the flow-to-flow similarity to generate highest priority virtual flow documents and methods for the source code for the application. Further, the system and method disclosed herein provide the technical solution of determining similarity between the virtual flow documents and a MAD by estimating similarities for the extracted features and the MAD to determine a flow-to-MAD similarity, and identifying relevant virtual flow documents from the virtual flow documents based on the flow-to-MAD similarity to generate ordered relevant virtual flow documents.

Figure 2:
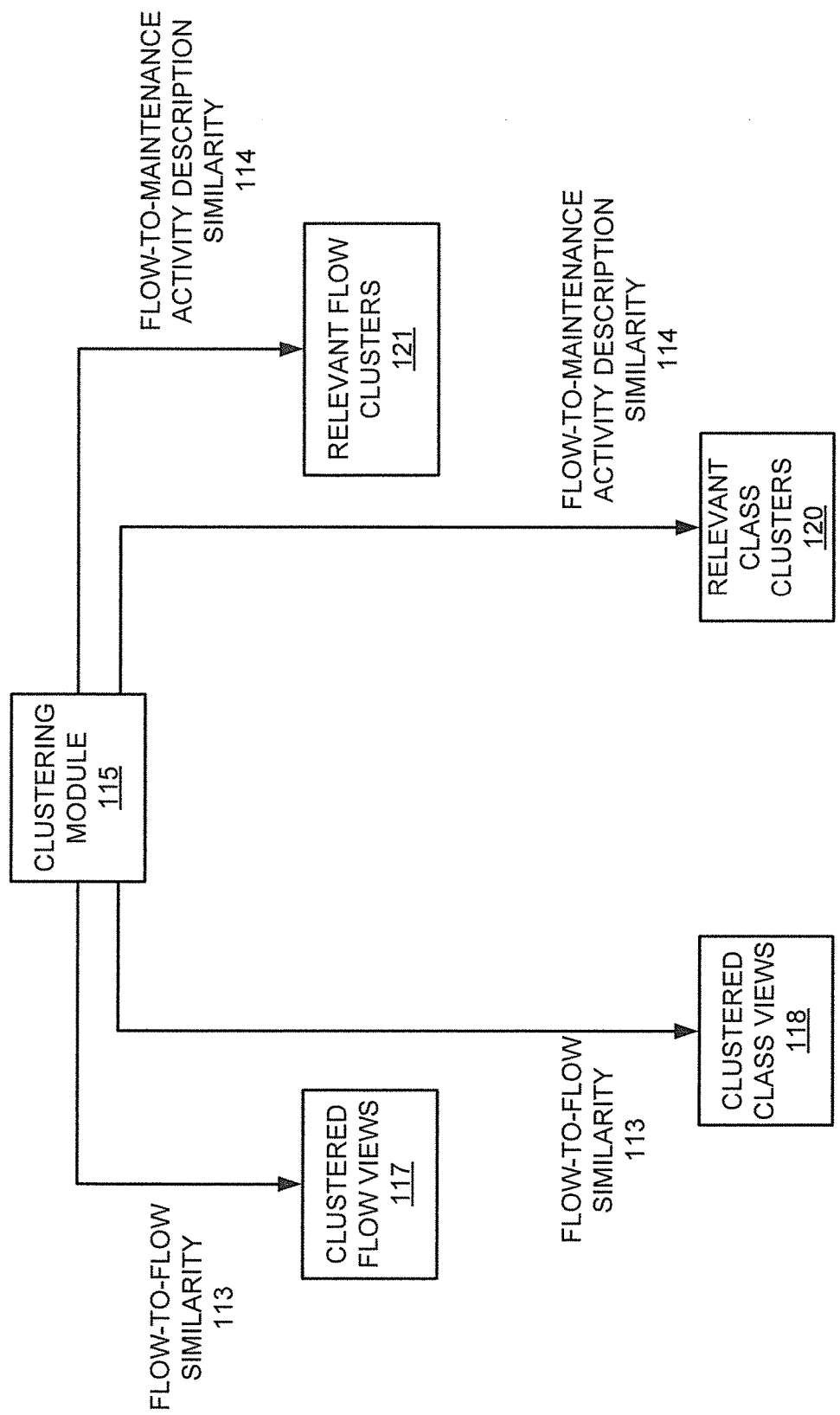
FIG. 2 illustrates a clustering module of the source code flow analysis system, according to an example of the present disclosure.
Figure 3:
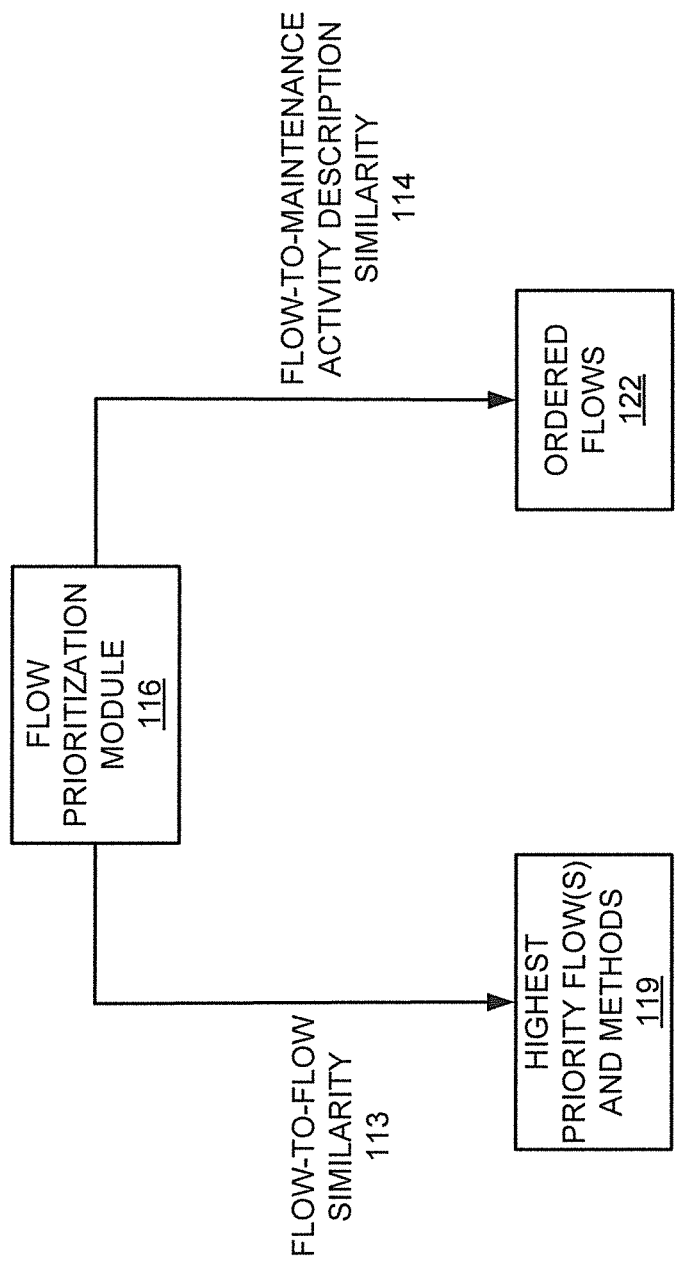
FIG. 3 illustrates a flow prioritization module of the source code flow analysis system, according to an example of the present disclosure.

FIG. 1 illustrates an architecture of a source code flow analysis system 100, according to an example of the present disclosure. Referring to FIG. 1, the system 100 is depicted as including an input/output module 101 that may include a user interface 102. The input/output module 101 may receive object oriented (OO) source code 103 and corresponding bytecode of an application 104 to be analyzed via a class repository 105 for applications. When a maintenance activity is to be performed on the application 104, the user interface 102 may be used to receive a description of proposed maintenance activity (i.e., a maintenance activity description (MAD)) 106 in natural language from a user 107 (e.g., a maintenance engineer). A virtual flow document identification module 108 may identify virtual flow documents 109 for the application 104. A virtual flow document may be defined as an ordered sequence of method calls identified statically. The virtual flow document identification module 108 may generate a method interaction (i.e., call flow, or control flow) graph 110 using the source code 103. A feature extraction module 111 may extract features of the virtual flow documents 109. The feature extraction module 111 may extract, for example, textual features, points in the flow (i.e., the virtual flow documents 109), controls in the flow, flow direction vectors, and method occurrence vectors. A similarity determination module 112 may estimate (i.e., determine) similarity between the virtual flow documents 109 to determine a flow-to-flow similarity 113. Alternatively or additionally, the similarity determination module 112 may estimate similarity between the virtual flow documents and the MAD 106 (i.e., a flow-to-MAD similarity 114). FIGS. 2 and 3 respectively illustrate details of a clustering module 115 and a flow prioritization module 116 of the source code flow analysis system 100, according to examples of the present disclosure. As shown in FIGS. 1 and 2, for the flow-to-flow similarity 113, the clustering module 115 may cluster the virtual flow documents 109 to generate clustered flow views 117 (i.e., clustered flows (virtual flow documents 109)), and/or clustered class views 118 (i.e., clustered classes). Further, as shown in FIGS. 1 and 3, for the flow-to-flow similarity 113, the flow prioritization module 116 may generate highest priority flow(s) (i.e., highest priority virtual flow documents 109) and methods 119 for the source code 103. The clustered flow views 117, clustered class views 118, and/or highest priority flow(s) and methods 119 may be displayed or otherwise conveyed to a user (e.g., the user 107) using the user interface 102. For the flow-to-MAD similarity 114, as shown in FIG. 2, the clustering module 115 may generate clustered class views (i.e., clustered flows) to further generate relevant class clusters 120, and generate clustered flow views (i.e., clustered classes) to further generate relevant flow clusters 121 (i.e., relevant virtual flow document clusters). Further, for the flow-to-MAD similarity 114, as shown in FIG. 3, the flow prioritization module 116 may identify relevant flows to generate ordered (i.e., ranked) flows 122 (i.e., ordered relevant virtual flow documents 109). The relevant class clusters 120, relevant flow clusters 121, and/or ordered flows 122 may be displayed or otherwise conveyed to a user (e.g., the user 107) using the user interface 102.

The modules and other components of the system 100 that perform various other functions in the system 100, may comprise machine readable instructions stored on a non-transitory computer readable medium. In addition, or alternatively, the modules and other components of the system 100 may comprise hardware or a combination of machine readable instructions and hardware.

Referring to FIGS. 1-4, FIG. 4 illustrates an example of the method interaction graph 110. The virtual flow document identification module 108 may generate the method interaction graph 110 using the source code 103. The method interaction graph 110 may be an and/or graph. The components of the method interaction graph 110 may be designated as G(N;E), where the nodes and edges are respectively designated as N and E. The nodes N of the method interaction graph 110, as represented by the ovals in the method interaction graph 110, may represent methods in the source code 103. The edges E of the method interaction graph 110, as represented by the arrows in the method interaction graph 110, may represent method calls in the source code 103. The edges may be annotated by if/switch condition(s) on which methods are called (if any). The virtual flow document identification module 108 may identify the source(s) (e.g., the node C1.F1A in FIG. 4) in the method interaction graph 110. Further, the virtual flow document identification module 108 may generate the paths (cycle-less) of the method interaction graph 110 using AND-OR semantics that start from the source as F=F1; F2; . . . Fn.

Figure 4:
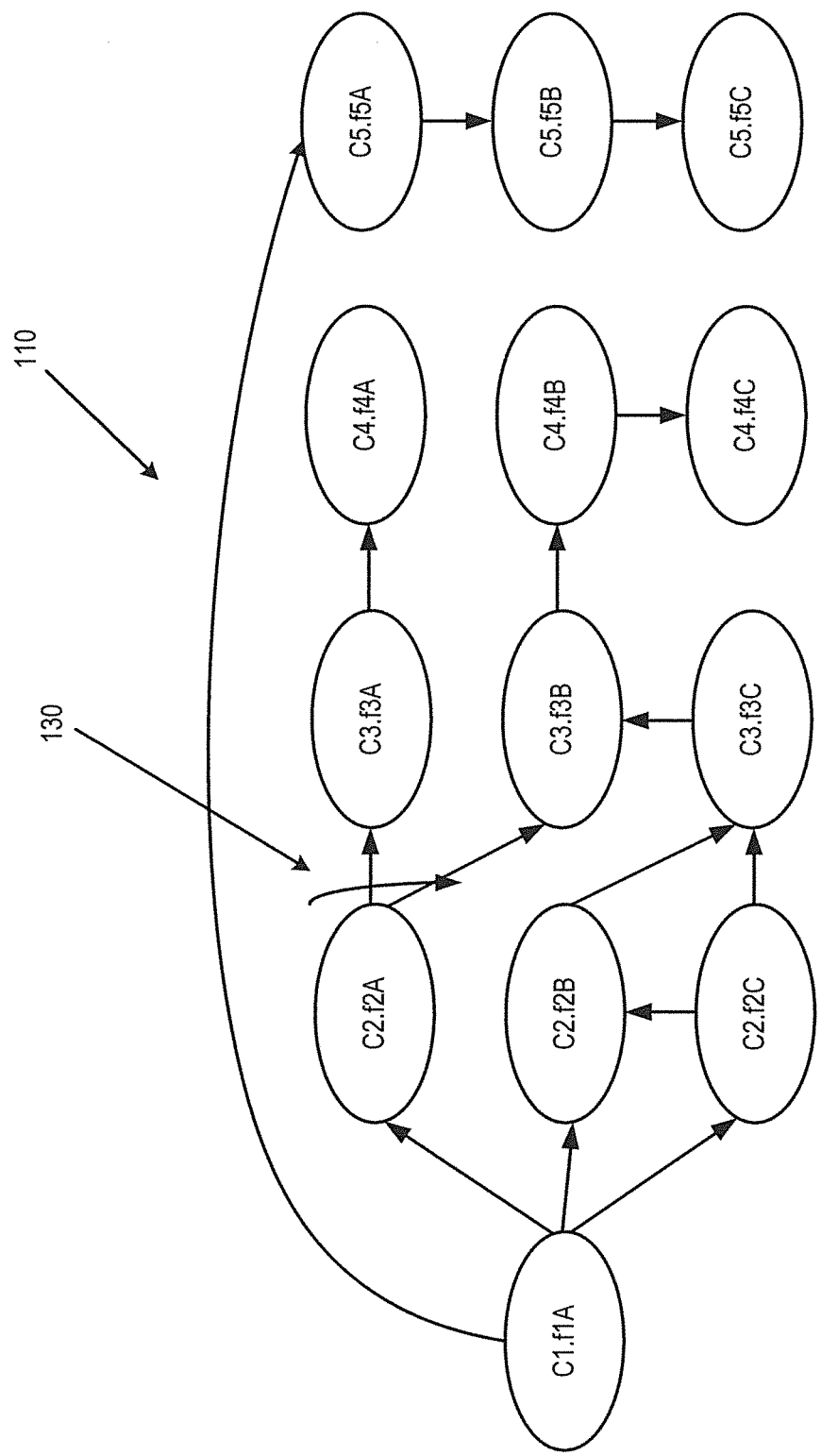
FIG. 4 illustrates a method interaction graph, according to an example of the present disclosure.

Referring to FIG. 4, for the example of the method interaction graph 110, the application 104 may include five classes (e.g., C1, C2, C3, C4, and C5) and three functions (i.e., fnA, fnB, and fnC, where n represents the relevant class).

For the method interaction graph 110, the AND edges may be designated as shown at 130 by crossing arrows, and the remaining edges are if conditions (i.e., OR Edges). For the example of the method interaction graph 110 of FIG. 4, the classes and functions may be designated as shown in FIG. 5A. For example, C1 may represent an InvoiceGenerator class, and f1A may be designated for the function GenerateInvoice(InvoiceType type, DataSourceName source). Similarly, classes C2, C3, C4, and C5 may respectively represent InvoiceDataCollector, InvoiceDataChecker, InvoiceClassifier, and InvoicePrinter. Each of these classes C2, C3, C4, and C5 may include related functions as shown in FIG. 5A.

Figure 5B:
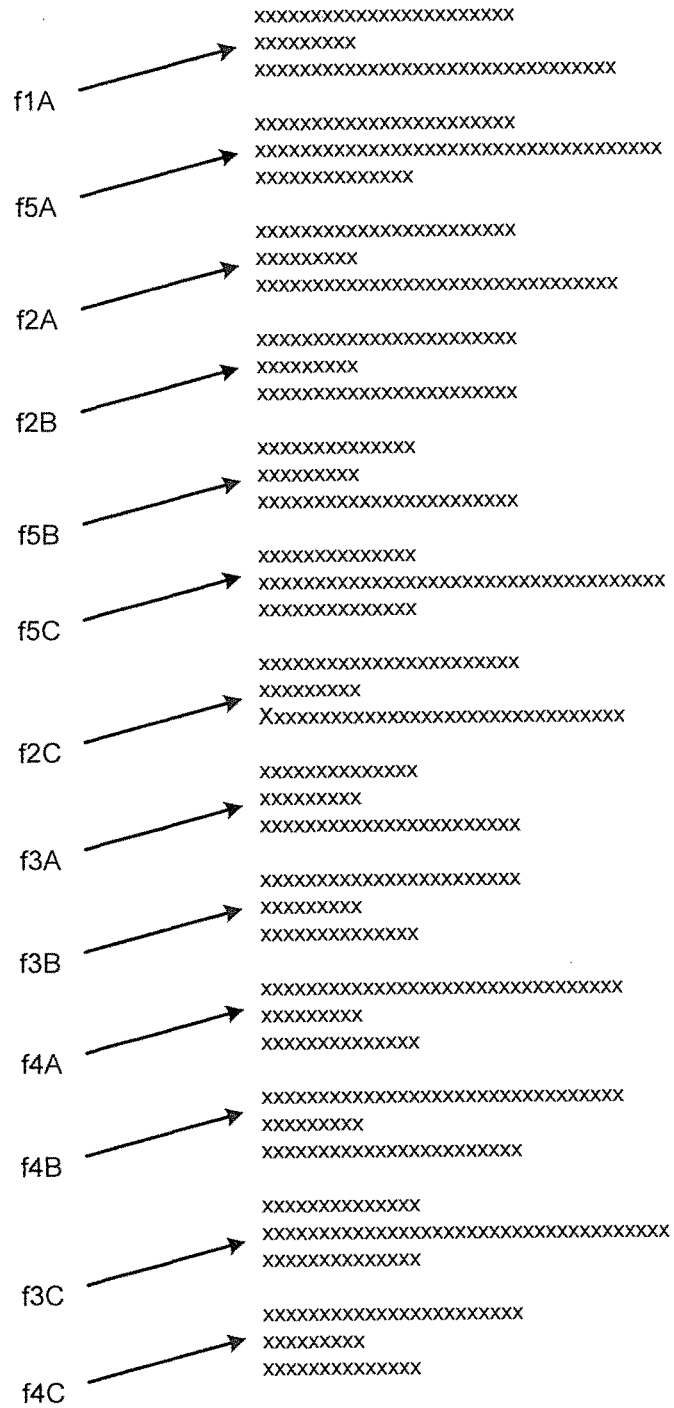
FIG. 5B illustrates a hypothetical source code listing, according to an example of the present disclosure.
Figure 6:
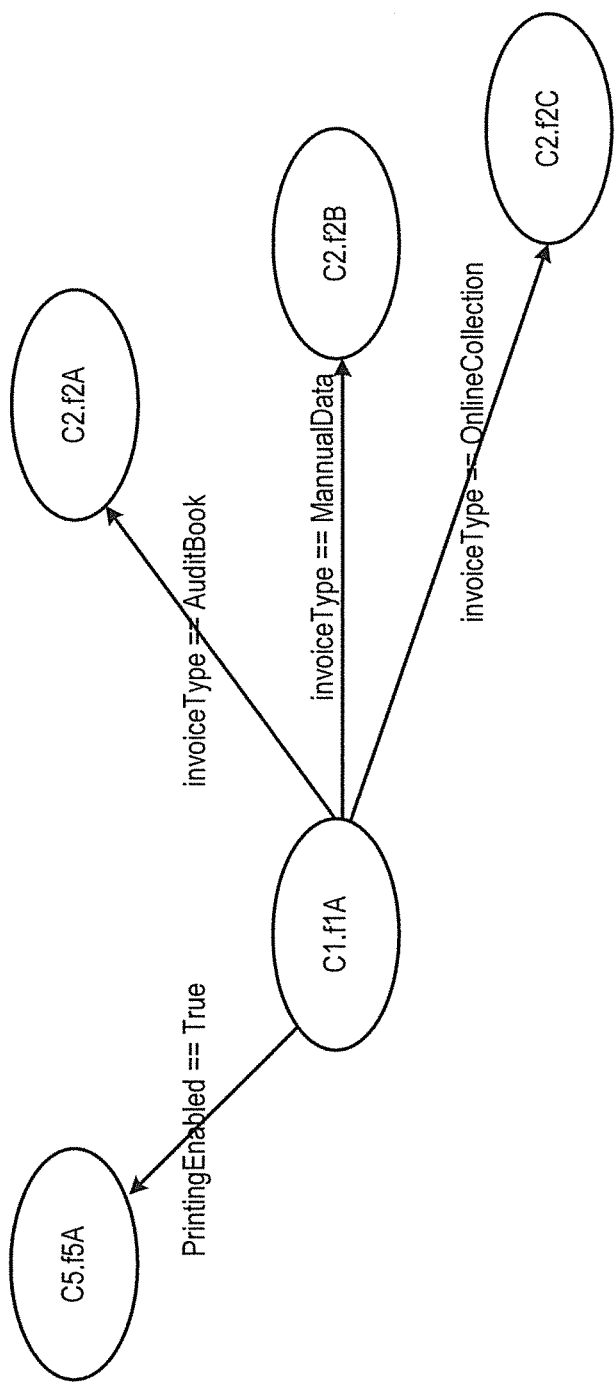
FIG. 6 illustrates if conditions, according to an example of the present disclosure.

As discussed above for the example of the method interaction graph 110 of FIG. 4, the edges E of the method interaction graph 110 may represent method calls in the source code 103, and the edges may be annotated by if/switch condition(s) on which methods are called (if any). For example, referring to FIGS. 4-6, FIG. 6 illustrates if conditions, according to an example of the present disclosure. For example, FIG. 6 illustrates if conditions for the call from C1 to C2 and C5, for the method interaction graph 110 of FIG. 4. Referring to FIGS. 4-6, for the call from C1 to C2 (i.e., C1.f1A to C2.f2A, C1.f1A to C2.f2B, and C1.f1A to C2.f2C), the if conditions are respectively shown as invoiceType==AuditBook, invoiceType==MannualData, and invoiceType==OnlineCollection. Similarly, for the call from C1 to C5 (i.e., C1.f1A to C5.f5A), the if condition is shown as PrintingEnabled==True.

For the example of the method interaction graph 110 of FIG. 4, the method interaction graph 110 may include five flows (i.e., five virtual flow documents 109). For example, a first flow F1 may begin at C1.f1A and end at C4.f4C (i.e., C1.f1A to C2.f2A to C3.f3A to C4.f4A to C3.f3B to C4.f4B to C4.f4C). A second flow F2 may begin at C1.f1A and end at C5.f5C (i.e., C1.f1A to C5.f5A to C5.f5B to C5.f5C). A third flow F3 may begin at C1.f1A and end at C4.f4C (i.e., C1.f1A to C2.f2B to C3.f3C to C3.f3B to C4.f4B to C4.f4C). A fourth flow F4 may begin at C1.f1A and end at C4.f4C (C1.f1A to C2.f2C to C3.f3C to C3.f3B to C4.f4B to C4.f4C). A fifth flow F5 may begin at C1.f1A and end at C4.f4C (i.e., C1.f1A to C2.f2C to C2.f2B to C3.f3C to C3.f3B to C4.f4B to C4.f4C).

Referring to FIGS. 1-3, the feature extraction module 111 is described for extraction of features of the virtual flow documents 109 (e.g., the five flows of the method interaction graph 110 of FIG. 4).

The feature extraction module 111 may extract, for example, textual (T) features, points (P) in the flow, controls (C) in the flow, flow direction vectors (V_d), and method occurrence vectors (V_o). For the textual features T, textual words may be extracted from the method definitions in the flow, and arranged as a co-occurrence vector after applying, for example, term frequency-inverse document frequency (TF-IDF). The TF-IDF may therefore provide a numerical statistic that reflects the importance of certain textual words in the virtual flow documents 109. The textual (T) features may be enhanced further by other techniques, such as, for example, latent semantic indexing (LSI). LSI may provide another indexing and retrieval method that may use a mathematical technique called singular value decomposition (SVD) to identify patterns in the relationships between terms and concepts contained in the virtual flow documents 109. For the points (P) in the flow, concept words may be extracted from method names, argument types, names in the flow, and corresponding class names. For the controls (C) in the flow, concept words may be extracted from the annotation text of the edges in the flow. For the flow direction vectors (V_d), flow direction vectors may be represented as V_d=[M_1; M_2; M_3;:::; M_n], where M1, M2, etc., may represent the enumerations given globally to the methods in the flow in the occurring sequence itself. For the method occurrence vectors (V_o), method occurrence vectors may be represented as V_o=[o1; o2;::oj;:::; on] where o_j=1 if the method enumerated as j (globally) appears in the flow, and otherwise, o_j=0.

For the example of the method interaction graph 110 of FIG. 4, the feature extraction module 111 may extract features of the virtual flow documents 109 (i.e., the five flows of the method interaction graph 110 of FIG. 4). The feature extraction module 111 may extract, for example, textual (T) features, points (P), controls (C), flow direction vectors (V_d), and method occurrence vectors (V_o), for the five flows of the method interaction graph 110 of FIG. 4.

Examples of feature extraction for the second (i.e., C1.f1A to C5.f5C) and third (i.e., C1.f1A to C4.f4C) flows for the example of the method interaction graph 110 of FIG. 4 are described.

For the example of the method interaction graph 110 of FIG. 4, for the second flow that begins at C1.f1A and ends at C5.f5C (i.e., C1.f1A to C5.f5A to C5.f5B to C5.f5C), with respect to textual (T) features, textual words may be extracted from the method definitions in the flow, and arranged as a co-occurrence vector after applying, for example, TF-IDF. For example, assuming some comments inside the method calls (i.e., method definitions in the flow) and omitting TF-IDF, the textual (T) features may be arranged as a co-occurrence vector as follows:

[word1, word2, . . . , wordr, print, align, stream, data, output, wordx, . . . wordn]

[0, 4, . . . , 1, 5, 7, 1, 3, 11, 0, . . . , 1]

If TF-IDF is included, the count of each word may be multiplied by log of a total number of flows divided by a total number of flows where the particular word appears. With respect to points (P) in the flow, concept words may be extracted from method names, argument types, and names in the flow, and corresponding class names. For example, points in the flow (omitting word stemming) may include:

{invoice, generator, generate, type, data, source, name, printer, print, set, style, send, stream}

With respect to controls (C) in the flow, concept words may be extracted from the annotation text of the edges in the flow. For example, controls in the flow (omitting word stemming) may include:

{printing, enabled, true}

With respect to flow direction vectors (V_d), assuming an order of methods as shown in the method interaction graph 110 of FIG. 4, an example of a flow direction vector may include:

[1, 11, 12, 13, 0, 0, 0, 0, 0, 0, 0, 0, 0]

With respect to method occurrence vectors (V_o), assuming an order of methods as shown in the method interaction graph 110 of FIG. 4, an example of a method occurrence vector may include:

[1, 0, 0, 0, 0, 0, 0, 0, 0, 0, 1, 1, 1]

For the example of the method interaction graph 110 of FIG. 4, for the third flow that begins at C1.f1A and ends at C4.f4C (i.e., C1.f1A to C2.f2B to C3.f3C to C3.f3B to C4.f4B to C4.f4C), with respect to textual (T) features, assuming some comments inside the method calls (i.e., method definitions in the flow) and omitting TF-IDF, the textual (T) features may be arranged as a co-occurrence vector as follows:

[word1, word2, . . . , wordr, print, align, stream, data, output, wordx, . . . word n]
[10, 3, . . . , 1, 0, 0, 0, 0, 4, 9, . . . , 2]

With respect to points (P) in the flow, points in the flow (omitting word stemming) may include:

{invoice, generator, generate, type, data, source, name, collector, collect, entered, manual, base, server, ip, table, checker, validate, parse, classifier, classify, other, compute, statistics}

With respect to controls (C) in the flow, controls in the flow (omitting word stemming) may include:

{invoice, type, manual, data}

With respect to flow direction vectors (V_d), assuming an order of methods as shown in the method interaction graph 110 of FIG. 4, an example of a flow direction vector may include:

[1, 3, 7, 9, 10, 0, 0, 0, 0, 0, 0, 0, 0]

With respect to method occurrence vectors (V_o), assuming an order of methods as shown in the method interaction graph 110 of FIG. 4, an example of a method occurrence vector may include:

[1, 0, 1, 0, 0, 0, 1, 0, 1, 1, 0, 0, 0]

Referring to FIGS. 1-3, the similarity determination module 112 is described for estimation of similarity between the virtual flow documents 109 to determine the flow-to-flow similarity 113 (e.g., a flow-to-flow similarity between the five flows of the method interaction graph 110 of FIG. 4).

The similarity determination module 112 may determine, for example, a textual similarity, an intersection similarity, a point similarity, a control similarity, a flow direction vector similarity, and a method occurrence vector similarity. For the textual similarity, the similarity determination module 112 may determine a cosine similarity of TF-IDF weighed word co-occurrence vectors of the flows. The intersection similarity may be based on a number of intersection (i.e., common) points or length of common threads divided by the length of the union of flows. The point similarity may be determined as a set similarity (e.g., Jaccard or another set similarity measure) between the points in the flows after applying, for example, TF-IDF. The Jaccard similarity may provide a statistic used for comparing the similarity and diversity of sample sets. The control similarity may be determined as a set similarity (e.g., Jaccard or another set similarity measure) between the controls in the flows after applying, for example, TF-IDF. The flow direction vector similarity may be determined as a cosine similarity measure between corresponding vectors of the flows. The method occurrence vector similarity may be determined as a cosine similarity measure between corresponding vectors of the flows.

For the example of the method interaction graph 110 of FIG. 4, with respect to the flow-to-flow similarity 113, an example of flow-to-flow similarity between the second (i.e., flow that begins at C1.f1A and ends at C5.f5C) and third (i.e., flow that begins at C1.f1A and ends at C4.f4C) flows is described for determining textual similarity, intersection similarity, point similarity, control similarity, flow direction vector similarity, and method occurrence vector similarity.

With respect to textual similarity, the similarity determination module 112 may determine a cosine similarity of TF-IDF weighed word co-occurrence vectors of the flows. For the second and third flows of the method interaction graph 110 of FIG. 4, the textual similarity may be determined as follows:

$$\frac{(0*10 + 4*3 + \ldots + 1*1 + 5*0 + 7*0 + \ldots 1*2)}{\sqrt[2]{0^2 + 4^2 + \cdots\ldots + 1^2} * \sqrt[2]{10^2 + 3^2 + \cdots\ldots + 2^2}} = \text{approximately } 0.13$$

With respect to intersection similarity between the second and third flows of the method interaction graph 110 of FIG. 4, the similarity determination module 112 may determine the intersection similarity as 1/9=0.11. This intersection similarity may be used by the similarity determination module 112 to conclude that one common method out of the total of nine common methods may occur in both the second and third flows. With respect to point similarity between the second and third flows of the method interaction graph 110 of FIG. 4, omitting TF-IDF, the similarity determination module 112 may determine the point similarity as 7/29=0.24. This point similarity may be used by the similarity determination module 112 to conclude that seven common words out of a total of twenty-nine words occur in both the second and third flows. With respect to control similarity between the second and third flows of the method interaction graph 110 of FIG. 4, omitting TF-IDF, the similarity determination module 112 may determine the control similarity as 0/7=0. This control similarity may be used by the similarity determination module 112 to conclude that no common words occur in the second and third flows. With respect to flow direction vector similarity, the similarity determination module 112 may determine a cosine similarity between corresponding vectors. For the second and third flows of the method interaction graph 110 of FIG. 4, the similarity determination module 112 may determine the flow direction vector similarity as follows:

$$\frac{(1*1 + 11*3 + 12*7 + 13*9 + 0*10 + 0*0 + \ldots 0*0)}{\sqrt[2]{1 + 11^2 + \cdots\ldots + 0^2} * \sqrt[2]{1^2 + 3^2 + \cdots\ldots + 0^2}} =$$

approximately 0.09

With respect to method occurrence vector similarity, the similarity determination module 112 may determine a cosine similarity between corresponding vectors of the flows. For the second and third flows of the method interaction graph 110 of FIG. 4, the similarity determination module 112 may determine the method occurrence vector similarity as follows:

$$\frac{(1*1 + 0*0 + 0*1 + \ldots 1*0)}{\sqrt[2]{1 + 0^2 + \cdots\ldots + 1^2} * \sqrt[2]{1^2 + 0^2 + \cdots\ldots + 0^2}} = \text{approximately } 0.05$$

With respect to the flow-to-flow similarity 113, the similarity determination module 112 may further estimate combined similarity between each pair of the virtual flow documents 109. For example, the similarity determination module 112 may select a relative significance factor for each of the foregoing similarity measures (i.e., textual similarity, intersection similarity, point similarity, control similarity, flow direction vector similarity, and method occurrence vector similarity) based on their type and quality such that their sum equals one. Further, for each pair of flows within the application 104, the similarity determination module 112 may calculate the combined similarity as the linear combination of the textual, intersection, point, control, flow direction vector, and method occurrence vector similarities using the relative significance factors selected for each of these similarity measures.

For the example of the method interaction graph 110 of FIG. 4, with respect to the flow-to-flow similarity 113, an example of combined similarity between the second (i.e., C1.f1A to C5.f5C) and third (i.e., C1.f1A to C4.f4C) flows is described. For the second and third flows of the method interaction graph 110 of FIG. 4, the similarity determination module 112 may determine the combined similarity score, giving equal relative significance factor for all the features, as follows:

(1/6)*0.13+(1/6)*0.11+(1/6)*0.24+(1/6)*0+(1/6)*0.09+(1/6)*0.05=0.103

FIG. 7 illustrates a flow-flow matrix 160, according to an example of the present disclosure. The combined similarity between each of the virtual flow documents 109 (e.g., flows 1-5 of the method interaction graph 110 of FIG. 4) are shown in the flow-flow matrix 160.

Referring to FIGS. 1-3, with respect to the flow-to-flow similarity 113, the clustering module 115 is described for clustering the virtual flow documents 109 to generate clustered flow views 117, and/or clustered class views 118.

With respect to the flow-to-flow similarity 113, the clustering module 115 may generate initial clustering by executing a connected components process by considering edges having a value of more than, for example, top 10% of the combined similarity scores, and disregarding other edges. The clustering module 115 may apply partitioning based clustering using the maximization, for example, of the modularization quality (MQ) as the selection criteria to choose from the clustering candidates. The MQ optimization may be performed using hill climbing and simulated annealing. The hill climbing technique is a mathematical optimization technique that includes an iterative process that starts with an arbitrary solution to a problem, and then attempts to find a better solution by incrementally changing a single element of the solution. The simulated annealing is a probabilistic procedure for the global optimization problem (i.e., optimization of a function according to some criteria) of locating a good approximation to the global optimum of a given function in a large search space. The clustering module 115 may take a single flow cluster from the clustered flows and group together classes that are part of at least a single flow in the cluster. This step of taking a single flow cluster from the clustered flows and grouping together classes that are part of at least a single flow in the cluster may be repeated for each cluster in the flow clusters, to provide an overlapping set of classes of the application 104.

For the example of the method interaction graph 110 of FIG. 4, an example of MQ computation is described for generation of the clustered flow views 117, and clustered class views 118.

For the example of the method interaction graph 110 of FIG. 4, the flows (e.g., {F1, F2, F3, F4, F5}) and the similarity measure between them may be partitioned, for example, as follows:

Way1 {F1, F2}, {F3}, {F4, F5}—This has 3 partitions
Way2 {F1, F3, F4, F5} {F2}—This has 2 partitions
Way3 {F1, F2, F3}, {F4, F5}
etc.

For each of these grouping styles, the MQ may be computed based on a similarity score between the flows in the same partition and different partitions. For each partition, a clustering factor may be calculated as follows:

MQ=sum of clustering factor of all partitions

Clustering factor of partition=intra connectivity of the partition/(inter connectivity of the partition+ intra connectivity of the partition)

intra connectivity of the partition=sum of similarities of flows occurring within the partition inter connectivity of the partition=sum of similarities of flows occurring in the partition with the flows occurring in other partitions The particular partitioning scheme may be selected based on the maximum or acceptable MQ.

Referring to FIGS. 1-3, with respect to the flow-to-flow similarity 113, the flow prioritization module 116 is described for determination of the highest priority flow(s) and methods 119 in the source code 103.

With respect to the flow-to-flow similarity 113, for the highest priority flow(s) and methods 119 in the source code 103, the flow prioritization module 116 may use the virtual flow documents 109 that are identified by the virtual flow identification module 108 to run the longest common subsequence process, to identify the longest common order of method calls across flows, present in at least one-half of the number of flows. For each of the various substrings (e.g., of length at least two) of the longest common method call order, the flow prioritization module 116 may populate the number of flows, for which each are part of. The flow prioritization module 116 may order these flows accordingly, and identify the maximum repeatedly occurring method sequences in the source code. Based on the method interaction graph 110, the flow prioritization module 116 may order the various methods based on the their recursive summing of indegree, that is, the flow prioritization module 116 may order the various methods with respect to the number of flows in which a particular method is part of.

For the example of the method interaction graph 110 of FIG. 4, an example of identification of the highest priority flow(s) and methods 119 in the source code 103 by the flow prioritization module 116 is described.

For the example of the method interaction graph 110 of FIG. 4, the longest common subsequence of all flows is the fourth flow itself which begins at C1.f1A and ends at C4.f4C (C1.f1A to C2.f2C to C3.f3C to C3.f3B to C4.f4B to C4.f4C), which is a subsequence of the fifth flow which begins at C1.f1A and ends at C4.f4C (i.e., C1.f1A to C2.f2C to C2.f2B to C3.f3C to C3.f3B to C4.f4B to C4.f4C). The fourth flow may represent the longest subsequence which is present in at least one-half of the total number of flows. The various substrings of this subsequence may be generated, and for each, the flow prioritization module 116 may check how many number of flows each are part of. For example, {C1.f1A, C3.f3B, C4.f4B, C4.f4C} is a part of four flows (i.e., first, third, fourth, and fifth flows), which have the highest such count. Thus, {C1.f1A, C3.f3B, C4.f4B, C4.f4C} may represent the most important flow in the source code 103. Thus, in order to address a defect with respect to the source code 103, instead of arbitrarily analyzing the source code 103, a user may be directed to analyze the source code 103 associated with {C1.f1A, C3.f3B, C4.f4B, C4.f4C} to address any defects with respect to the source code 103. For example, referring to FIG. 5B, a hypothetical source code 103 may include lines in the code that correspond to the functions f1A, f2A, f2B, f2C, f3A, etc., as shown in FIG. 5B. In order to address a defect with respect to the hypothetical source code 103 of FIG. 5B, a user may be directed to analyze the source code 103 associated with {C1.f1A, C3.f3B, C4.f4B, C4.f4C} to address any defects with respect to the source code 103. Based on the method interaction graph 110, the flow prioritization module 116 may order the various methods based on the their recursive summing of indegree, that is, the flow prioritization module 116 may order the various methods with respect to the number of flows in which a particular method is part of. The indegree of vertices may be calculated by recursive summing as follows:

Indegree of $C1.f1A=0$ (taking this as 1)

Indegree of $C2.f2A=1*$Indegree of $C1.f1A=1$

Indegree of $C2.f2B=1*$Indegree of $C1.f1A+1*$Indegree of $C2.f2C=2$

Indegree of $C2.f2C=1*$Indegree of $C1.f1A=1$

Indegree of $C3.f3C=1*$Indegree of $C2.f2B+1*$Indegree of $C2.f2C=3$

Similarly, the flow prioritization module 116 may determine the indegree of all the methods and sort them to identify the most important method(s).

Referring to FIGS. 1-3, the similarity determination module 112 is described for estimation of the flow-to-MAD similarity 114.

With respect to the flow-to-MAD similarity 114, the similarity determination module 112 may estimate similarity between the virtual flow documents and the MAD 106. For example, the similarity determination module 112 may determine a textual similarity, a point similarity, and a control similarity for the flow-to-MAD similarity 114. For the textual similarity, the similarity determination module 112 may determine a cosine similarity of a TF-IDF weighed word co-occurrence vector of the flow (i.e., the virtual flow document 109) and similarly formed vector of the MAD (i.e., the MAD 106). The point similarity may be determined as a set similarity (e.g., Jaccard or another set similarity measure) between the points in the flow after applying, for example, TF-IDF, and the concept words extracted from the MAD. The control similarity may be determined as a set similarity (e.g., Jaccard or another set similarity measure) between the controls in the flow after applying, for example, TF-IDF, and the concept words extracted from the MAD.

For the example of the method interaction graph 110 of FIG. 4, with respect to the flow-to-MAD similarity 114, an example of similarity between the virtual flow documents 109 (e.g., the second flow that begins at C1.f1A and ends at C5.f5C) and the MAD 106 (e.g., a MAD M2 that indicates: The printing of the invoice has alignment problems. Also change the printing color) is described for determining textual similarity, point similarity, and control similarity.

With respect to textual similarity for the flow-to-MAD similarity 114, the similarity determination module 112 may determine the textual similarity as a cosine similarity of TF-IDF weighed word co-occurrence vector of the second flow and a similarly formed vector of the MAD M2. For example, the similarity determination module 112 may determine a cosine similarity of the vectors (textual feature vector of the second flow and textual feature vector of MAD M2 constructed in the same manner). With respect to point similarity, the similarity determination module 112 may determine the Jaccard similarity of the sets (e.g., points of the second flow and set of words occurring in MAD M2, that is, {printing, invoice, alignment, color, problems, change}. The similarity determination module 112 may determine the point similarity as 2/17, that is, {printing and invoice common}. With respect to control similarity, the similarity determination module 112 may determine the Jaccard similarity of the sets (e.g., controls of the second flow and set of words occurring in the MAD M2, that is, {printing, invoice, alignment, color, problems, change}. The similarity determination module 112 may determine the control similarity as 1/8, that is, {printing common}. As discussed herein with respect to the combined similarity between each pair of the flow documents 109 (i.e., for the flow-to-flow similarity 113), the scores for textual similarity, point similarity, and control similarity may be combined based on a relative significance factor for the flow-to-MAD similarity 114. FIG. 8 illustrates a MAD-flow matrix 170, according to an example of the present disclosure. The combined similarity between the flows (e.g., flows 1-5 of the method interaction graph 110 of FIG. 4) and MADs (e.g., M1 and M2) are shown in the MAD-flow matrix 170, where MAD M1 (e.g., The audit book data in the invoice is having duplicates) is discussed below.

Referring to FIGS. 1-3, with respect to the flow-to-MAD similarity 114, the flow prioritization module 116 is described for determination of the ordered (i.e., ranked) flows 122.

With respect to the flow-to-MAD similarity 114, the flow prioritization module 116 may identify relevant flows to generate the ordered flows 122. For example, based on the textual, point, and control similarities determined by the similarity determination module 112, the flow prioritization module 116 may order the flows to generate the ordered flows 122. Further, the flow prioritization module 116 may output top 'n' (e.g., 5), flows as relevant flows to the user 107.

For the example of the method interaction graph 110 of FIG. 4, the method interaction graph 110 includes five flows (i.e., a first flow that begins at C1.f1A and ends at C4.f4C, a second flow that begins at C1.f1A and ends at C5.f5C, a third flow that begins at C1.f1A and ends at C4.f4C, a fourth flow that begins at C1.f1A and ends at C4.f4C, and a fifth flow that begins at C1.f1A and ends at C4.f4C). Assuming the user 107 (e.g., a maintenance engineer) inputs the MAD M1 (e.g., The audit book data in the invoice is having duplicates), the flow prioritization module 116 may generate ordered flows 1 and 3 to the user 107 (i.e., to look at flow 1 and then flow 3 for MAD M1) as the ordered flows 122. Alternatively, assuming the user 107 (e.g., a maintenance engineer) inputs the MAD M2 (e.g., The printing of the invoice has alignment problems. Also change the printing color), the flow prioritization module 116 may generate flow 2 to the user 107 (i.e., to look at flow 2 for MAD M2) as the ordered flows 122.

Referring to FIGS. 1-3, with respect to the flow-to-MAD similarity 114, the clustering module 115 is described for generation of the relevant flow clusters 121.

With respect to the flow-to-MAD similarity 114, for the flow clusters identified by the clustering module 115 as discussed above with respect to the initial clustering and partitioning based clustering for the flow-to-flow similarity 113, the clusters may be filtered such that at least one flow output by the flow prioritization module 116 is presented to the user 107. The flow(s) presented to the user 107 may represent the relevant flow clusters 121.

For the example of the method interaction graph 110 of FIG. 4 that includes five flows, assuming the user 107 (e.g., a maintenance engineer) inputs the MADs M1 (e.g., The audit book data in the invoice is having duplicates) and M2 (e.g., The printing of the invoice has alignment problems. Also change the printing color), the clustering module 115 may filter clusters such that at least one flow output by the flow prioritization module 116 is presented to the user 107. For example, the relevant flow clusters 121 presented to the user 107 may include flows 1, 3, 4, and 5 in one cluster and flow 2 in another cluster. The first cluster may be more relevant for carrying out MAD M1, and the second cluster may be more relevant for carrying out MAD M2.

Referring to FIGS. 1-3, with respect to the flow-to-MAD similarity 114, the clustering module 115 is described for generation of the relevant class clusters 120.

With respect to the flow-to-MAD similarity 114, the relevant flow clusters 121 may be used to identify corresponding classes and presented to the user 107. The classes presented to the user 107 may represent the relevant class clusters 120. Alternatively, the relevant class clusters 120 may be generated from the clustered class views 118, for example, based on lookup.

For the example of the method interaction graph 110 of FIG. 4 that includes five flows, assuming the user 107 (e.g., a maintenance engineer) inputs the MADs M1 (e.g., The audit book data in the invoice is having duplicates) and M2 (e.g., The printing of the invoice has alignment problems. Also change the printing color), the relevant flow clusters 121 may be used to identify corresponding classes and presented to the user 107. Thus, based on the relevant flow clusters 121, the relevant class clusters 120 may include classes (C1, C2, C3, and C4) and (C1, and C5). The first cluster may be more relevant for carrying out MAD M1, and the second cluster may be more relevant for carrying out MAD M2.

Figure 9:
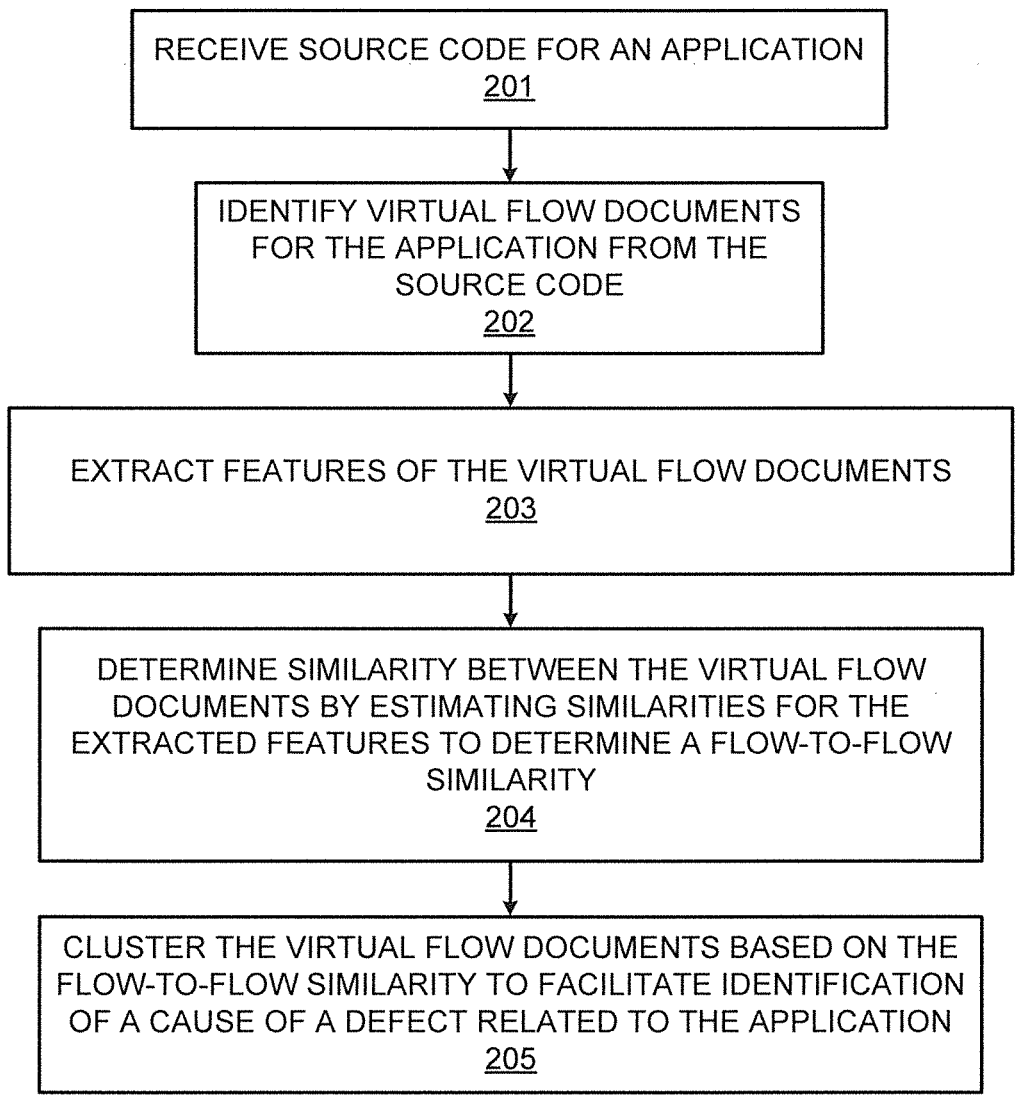
FIG. 9 illustrates a method for source code flow analysis, according to an example of the present disclosure.
Figure 10:
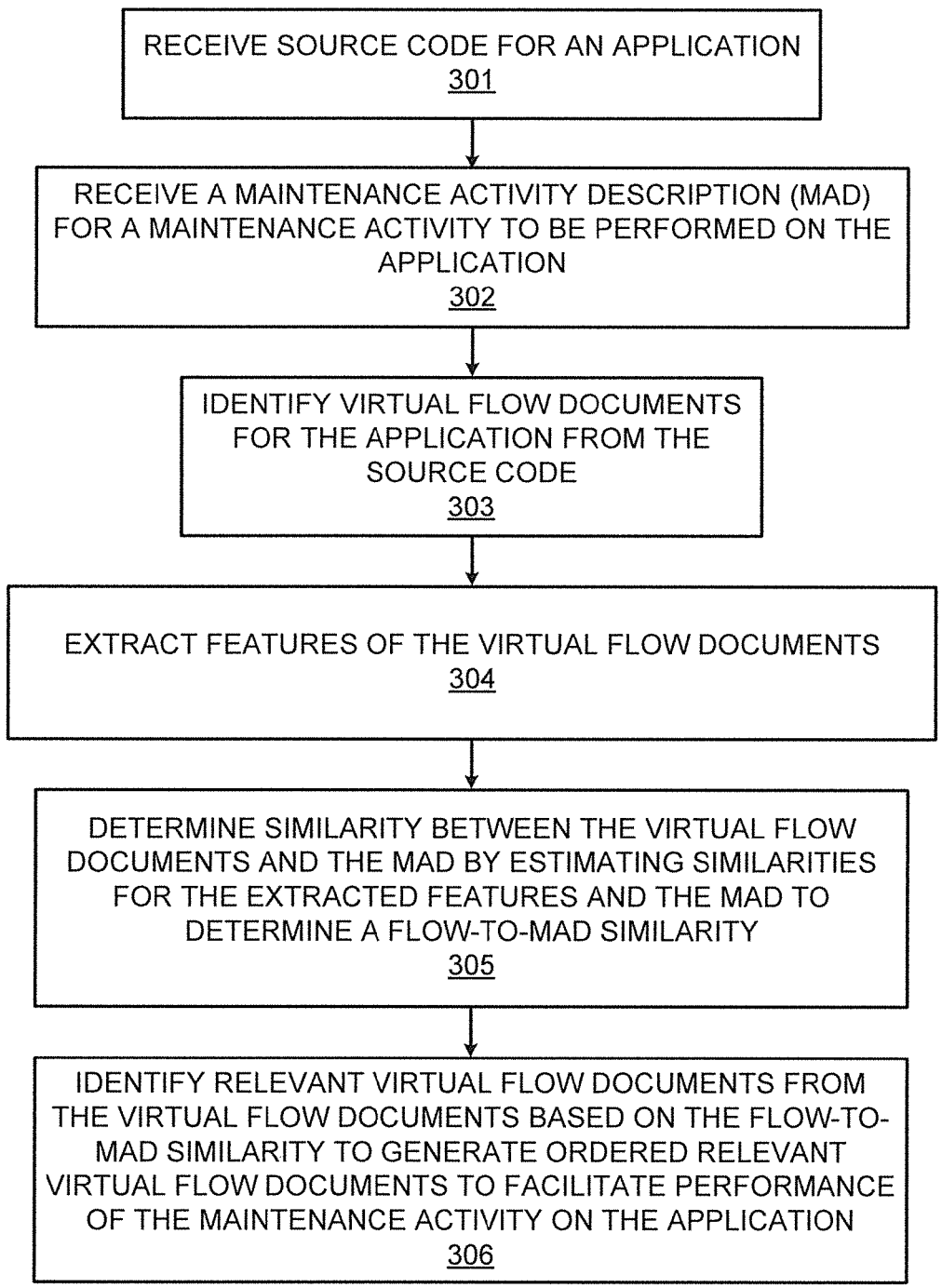
FIG. 10 illustrates further details of the method for source code flow analysis, according to an example of the present disclosure.

FIGS. 9 and 10 respectively illustrate flowcharts of methods 200 and 300 for source code flow analysis, according to examples. The methods 200 and 300 may be implemented on the source code flow analysis system 100 described above with reference to FIGS. 1-8 by way of example and not limitation. The methods 200 and 300 may be practiced in other systems.

Referring to FIG. 9, at block 201, source code for an application may be received. For example, referring to FIGS. 1-3, the input/output module 101 may receive the source code 103 and corresponding bytecode of the application 104 to be analyzed via the class repository 105 for applications.

At block 202, virtual flow documents for the application may be identified from the source code. The virtual flow documents may represent ordered sequences of method calls for the application. For example, referring to FIGS. 1-3, the virtual flow document identification module 108 may identify virtual flow documents 109 for the application 104. Identifying the virtual flow documents for the application from the source code may further include generating a method interaction graph using the source code. The method interaction graph may include nodes that represent methods in the source code and edges that represent the method calls in the source code. The edges may be annotated by if/switch conditions.

At block 203, features of the virtual flow documents may be extracted. For example, referring to FIGS. 1-3, the feature extraction module 111 may extract features of the virtual flow documents 109. Extracting the features of the virtual flow documents may further include extracting textual features from method definitions in the virtual flow documents and arranging the extracted textual features as a co-occurrence vector, extracting points from concept words for method names in the virtual flow documents, and extracting controls from concept words in annotation text of edges in the virtual flow documents. Extracting the features of the virtual flow documents may further include extracting flow direction vectors for the virtual flow documents. The flow direction vectors for the virtual flow documents may represent global enumerations to methods in the virtual flow documents. Extracting the features of the virtual flow documents may further include extracting method occurrence vectors for the virtual flow documents. The method occurrence vectors for the virtual flow documents may represent methods in the virtual flow documents.

At block 204, similarity between the virtual flow documents may be determined by estimating similarities for the extracted features to determine a flow-to-flow similarity. For example, referring to FIGS. 1-3, the similarity determination module 112 may estimate (i.e., determine) similarity between the virtual flow documents 109 to determine the flow-to-flow similarity 113. Determining similarity between the virtual flow documents may further include determining a textual similarity by determining a cosine similarity of word co-occurrence vectors of the virtual flow documents, determining an intersection similarity by determining a number of intersection points divided by a length of union of the virtual flow documents, determining a point similarity by determining a set similarity between points in the virtual flow documents, and determining a control similarity by determining a set similarity between controls in the virtual flow documents. Determining similarity between the virtual flow documents may further include determining a flow direction vector similarity by determining a cosine similarity between corresponding flow direction vectors of the virtual flow documents, and determining a method occurrence vector similarity by determining a cosine similarity between corresponding method occurrence vectors of the virtual flow documents. Determining similarity between the virtual flow documents may further include using flow-to-flow similarity to generate highest priority virtual flow documents and methods for the source code for the application. Using the flow-to-flow similarity to generate the highest priority virtual flow documents and the methods for the source code for the application may further include using the virtual flow documents to execute a longest common subsequence process to identify a longest common order of the method calls across the virtual flow documents present in a predetermined number of the virtual flow documents, and ordering methods based on recursive summing of indegree of the methods.

At block 205, the virtual flow documents may be clustered based on the flow-to-flow similarity to facilitate identification of a cause of a defect related to the application. For example, referring to FIGS. 1-3, for the flow-to-flow similarity 113, the clustering module 115 may cluster the virtual flow documents 109 to generate clustered flow views 117 (i.e., clustered flows (virtual flow documents 109)), and/or clustered class views 118 (i.e., clustered classes) to facilitate identification of a cause of a defect related to the application.

Clustering the virtual flow documents based on the flow-to-flow similarity may further include generating initial clustering by executing a connected components process by using edges of the method interaction graph that include a predetermined combined similarity score, applying partitioning based clustering using maximization of MQ to select from the initial clustering, and generating clustered virtual flow documents and/or clustered classes for the application based on the partitioning based clustering.

Referring to FIG. 10, at block 301, source code for an application may be received. For example, referring to FIGS. 1-3, the input/output module 101 may receive the source code 103 and corresponding bytecode of the application 104 to be analyzed via the class repository 105 for applications.

At block 302, a maintenance activity description (MAD) for a maintenance activity to be performed on the application may be received. For example, referring to FIGS. 1-3, when a maintenance activity is to be performed on the application 104, the user interface 102 may be used to receive a description of proposed maintenance activity (i.e., the maintenance activity description (MAD)) 106 in natural language from the user 107 (e.g., a maintenance engineer).

At block 303, virtual flow documents for the application may be identified from the source code. The virtual flow documents may represent ordered sequences of method calls for the application. For example, referring to FIGS. 1-3, the virtual flow document identification module 108 may identify virtual flow documents 109 for the application 104.

At block 304, features of the virtual flow documents may be extracted. For example, referring to FIGS. 1-3, the feature extraction module 111 may extract features of the virtual flow documents 109.

At block 305, similarity between the virtual flow documents and the MAD may be determined by estimating similarities for the extracted features and the MAD to determine a flow-to-MAD similarity. For example, referring to FIGS. 1-3, the similarity determination module 112 may estimate similarity between the virtual flow documents and the MAD 106 (i.e., the flow-to-MAD similarity 114). Determining similarity between the virtual flow documents and the MAD by estimating similarities for the extracted features and the MAD to determine a flow-to-MAD similarity may further include determining a textual similarity by determining a cosine similarity of word co-occurrence vectors of the virtual flow documents and the MAD, determining a point similarity by determining a set similarity between points in the virtual flow documents and the MAD, and determining a control similarity by determining a set similarity between controls in the virtual flow documents and the MAD. Further, a combined similarity may be determined between the virtual flow documents and the MAD.

At block 306, relevant virtual flow documents may be identified from the virtual flow documents based on the flow-to-MAD similarity to generate ordered relevant virtual flow documents to facilitate performance of the maintenance activity on the application. For example, referring to FIGS. 1-3, for the flow-to-MAD similarity 114, the flow prioritization module 116 may identify relevant flows to generate ordered (i.e., ranked) flows 122 (i.e., ordered relevant virtual flow documents 109) to facilitate performance of the maintenance activity on the application. Further, similarity between the virtual flow documents may be determined by estimating similarities for the extracted features to determine a flow-to-flow similarity, the virtual flow documents may be clustered based on the flow-to-flow similarity to generate clustered virtual flow documents for the application, and the relevant virtual flow documents and the clustered virtual flow documents may be filtered to generate relevant virtual flow document clusters. Further, similarity between the virtual flow documents may be determined by estimating similarities for the extracted features to determine a flow-to-flow similarity, the virtual flow documents may be clustered based on the flow-to-flow similarity to generate clustered classes for the application, and the relevant virtual flow documents and the clustered classes may be used to generate relevant class clusters. Alternatively, the relevant virtual flow document clusters may be used to generate the relevant class clusters.

Figure 11:
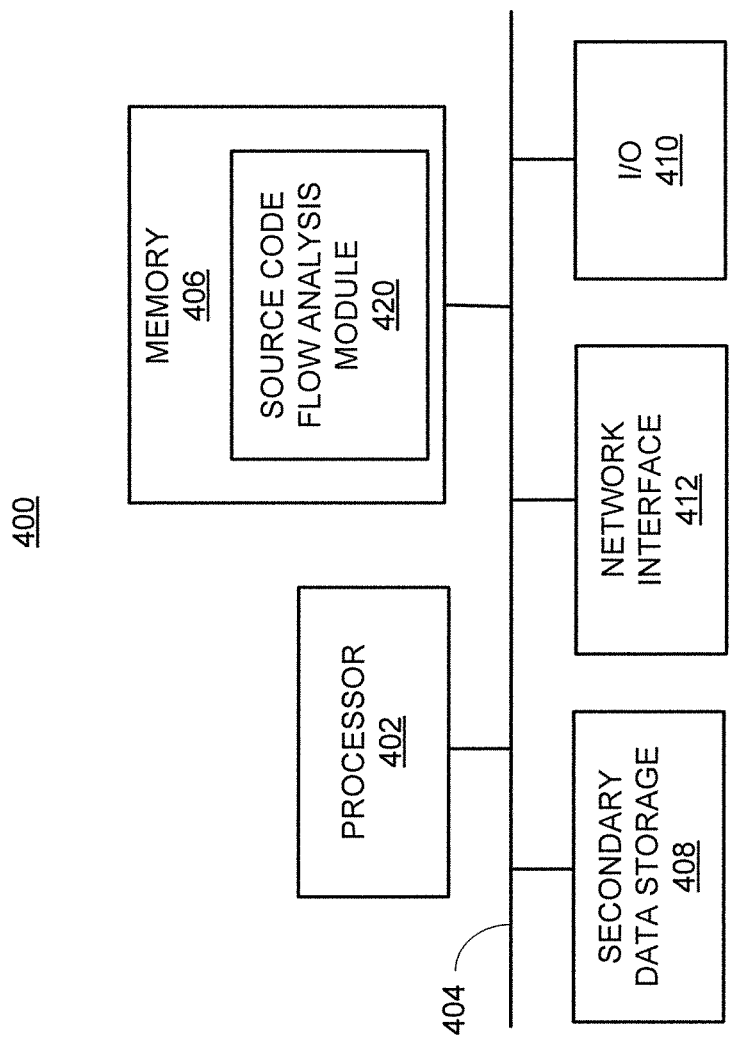
FIG. 11 illustrates a computer system, according to an example of the present disclosure.

FIG. 11 shows a computer system 400 that may be used with the examples described herein. The computer system 400 represents a generic platform that includes components that may be in a server or another computer system. The computer system 400 may be used as a platform for the system 100. The computer system 400 may execute, by a processor or other hardware processing circuit, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 includes a processor 402 that may implement or execute machine readable instructions performing some or all of the methods, functions and other processes described herein. Commands and data from the processor 402 are communicated over a communication bus 404. The computer system 400 also includes a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include a source code flow analysis module 420 including machine readable instructions residing in the memory 406 during runtime and executed by the processor 402. The module 420 may include the modules of the system 100 described with reference to FIGS. 1-8.

The computer system 400 may include an I/O device 410, such as a keyboard, a mouse, a display, etc. The computer system 400 may include a network interface 412 for connecting to a network. Other known electronic components may be added or substituted in the computer system 400.

What has been described and illustrated herein are examples along with some of their variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A source code flow analysis system comprising:
 a memory storing machine readable instructions to:
  receive source code for an application;
  identify virtual flow documents for the application from the source code, wherein the virtual flow documents represent ordered sequences of method calls for the application;

extract textual features, points, and controls of the virtual flow documents by
extracting the textual features from method definitions in the virtual flow documents and arranging the extracted textual features as a co-occurrence vector,
extracting, for the points, concept words from method names in the virtual flow documents, argument types in the virtual flow documents, and corresponding class names, and
extracting, for the controls, concept words from annotation text of edges in the virtual flow documents;
determine similarity between the virtual flow documents by estimating similarities for the extracted textual features, points, and controls to determine a flow-to-flow similarity by determining
a textual similarity by determining a cosine similarity of word co-occurrence vectors of the virtual flow documents,
an intersection similarity by determining a number of intersection points divided by a length of union of the virtual flow documents,
a point similarity by determining a set similarity between the points in the virtual flow documents, and
a control similarity by determining a set similarity between the controls in the virtual flow documents; and
cluster the virtual flow documents based on the flow-to-flow similarity to facilitate identification of a cause of a defect related to the application; and
a processor to implement the machine readable instructions.

2. The source code flow analysis system according to claim 1, wherein to identify the virtual flow documents for the application from the source code, the machine readable instructions are further to:
generate a method interaction graph using the source code, wherein the method interaction graph comprises nodes that represent methods in the source code and edges that represent the method calls in the source code.

3. The source code flow analysis system according to claim 2, wherein to generate a method interaction graph using the source code, the machine readable instructions are further to:
annotate the edges by if/switch conditions.

4. The source code flow analysis system according to claim 1, wherein to extract the textual features, points, and controls of the virtual flow documents, the machine readable instructions are further to:
extract flow direction vectors for the virtual flow documents, wherein the flow direction vectors for the virtual flow documents represent global enumerations to methods in the virtual flow documents.

5. The source code flow analysis system according to claim 1, wherein to extract the textual features, points, and controls of the virtual flow documents, the machine readable instructions are further to:
extract method occurrence vectors for the virtual flow documents, wherein the method occurrence vectors for the virtual flow documents represent methods in the virtual flow documents.

6. The source code flow analysis system according to claim 1, wherein to determine similarity between the virtual flow documents by estimating similarities for the extracted textual features, points, and controls to determine the flow-to-flow similarity, the machine readable instructions are further to:
determine a flow direction vector similarity by determining a cosine similarity between corresponding flow direction vectors of the virtual flow documents; and
determine a method occurrence vector similarity by determining a cosine similarity between corresponding method occurrence vectors of the virtual flow documents.

7. The source code flow analysis system according to claim 1, further comprising machine readable instructions to:
determine a combined similarity between each pair of the virtual flow documents.

8. The source code flow analysis system according to claim 1, wherein to cluster the virtual flow documents based on the flow-to-flow similarity, the machine readable instructions are further to:
generate initial clustering by executing a connected components process by using edges of a method interaction graph that include a predetermined combined similarity score;
apply partitioning based clustering using maximization of modularization quality to select from the initial clustering; and
generate at least one of clustered virtual flow documents and clustered classes for the application based on the partitioning based clustering.

9. The source code flow analysis system according to claim 1, further comprising machine readable instructions to:
use the flow-to-flow similarity to generate highest priority virtual flow documents from the identified virtual flow documents and methods for the source code for the application.

10. The source code flow analysis system according to claim 9, wherein to use the flow-to-flow similarity to generate the highest priority virtual flow documents and the methods for the source code for the application, the machine readable instructions are further to:
use the virtual flow documents to execute a longest common subsequence process to identify a longest common order of the method calls across the virtual flow documents present in a predetermined number of the virtual flow documents.

11. The source code flow analysis system according to claim 10, wherein to use the flow-to-flow similarity to generate highest priority virtual flow documents and methods for the source code for the application, the machine readable instructions are further to:
order methods based on recursive summing of indegree of the methods.

12. A source code flow analysis system comprising:
a memory storing machine readable instructions to:
receive source code for an application;
receive a maintenance activity description (MAD) for a maintenance activity to be performed on the application;
identify virtual flow documents for the application from the source code, wherein the virtual flow documents represent ordered sequences of method calls for the application;
extract textual features, points, and controls of the virtual flow documents by extracting the textual features from method definitions in the virtual flow documents and arranging the extracted textual features as a co-occurrence vector, extracting, for the points, concept words from method names in the virtual flow documents, argument types in the virtual flow documents, and corresponding class names, and extracting, for the controls, concept words from annotation text of edges in the virtual flow documents;

determine similarity between the virtual flow documents and the MAD by estimating similarities for the extracted textual features, points, and controls and the MAD to determine a flow-to-MAD similarity by determining a textual similarity by determining a cosine similarity of word co-occurrence vectors of the virtual flow documents and the MAD, a point similarity by determining a set similarity between the points in the virtual flow documents and the MAD, and a control similarity by determining a set similarity between the controls in the virtual flow documents and the MAD; and identify relevant virtual flow documents from the virtual flow documents based on the flow-to-MAD similarity to generate ordered relevant virtual flow documents to facilitate performance of the maintenance activity on the application; and a processor to implement the machine readable instructions.

13. The source code flow analysis system according to claim 12, further comprising machine readable instructions to:

determine similarity between the virtual flow documents by estimating similarities for the extracted textual features, points, and controls to determine a flow-to-flow similarity;

cluster the virtual flow documents based on the flow-to-flow similarity to generate clustered virtual flow documents for the application; and filter the relevant virtual flow documents and the clustered virtual flow documents to generate relevant virtual flow document clusters.

14. The source code flow analysis system according to claim 12, further comprising machine readable instructions to:

determine similarity between the virtual flow documents by estimating similarities for the extracted textual features, points, and controls to determine a flow-to-flow similarity;

cluster the virtual flow documents based on the flow-to-flow similarity to generate clustered classes for the application; and use the relevant virtual flow documents and the clustered classes to generate relevant class clusters.

15. The source code flow analysis system according to claim 12, further comprising machine readable instructions to:

determine a combined similarity between the virtual flow documents and the MAD.

16. A non-transitory computer readable medium having stored thereon machine readable instructions for source code flow analysis, the machine readable instructions when executed cause a computer system to:

receive source code for an application;

generate a method interaction graph using the source code, wherein the method interaction graph comprises nodes that represent methods in the source code and edges that represent method calls in the source code;

identify virtual flow documents for the application in the method interaction graph, wherein the virtual flow documents represent ordered sequences of method calls for the application;

extract textual features, points, and controls of the virtual flow documents by extracting the textual features from method definitions in the virtual flow documents and arranging the extracted textual features as a co-occurrence vector, extracting, for the points, concept words from method names in the virtual flow documents, argument types in the virtual flow documents, and corresponding class names, and extracting, for the controls, concept words from annotation text of edges in the virtual flow documents;

determine similarity between the virtual flow documents by estimating similarities for the extracted textual features, points, and controls to determine a flow-to-flow similarity by determining a flow direction vector similarity by determining a cosine similarity between corresponding flow direction vectors of the virtual flow documents, and a method occurrence vector similarity by determining a cosine similarity between corresponding method occurrence vectors of the virtual flow documents; and cluster, by a processor, the virtual flow documents based on the flow-to-flow similarity to generate at least one of clustered flows and clustered classes for the application to facilitate identification of a cause of a defect related to the application by using relevant virtual flow documents to generate relevant class clusters, wherein a first class cluster is more relevant for carrying out a first maintenance activity and a second class cluster is more relevant for carrying out a second maintenance activity.

17. The non-transitory computer readable medium according to claim 16, wherein the machine readable instructions to determine similarity between the virtual flow documents by estimating similarities for the extracted textual features, points, and controls to determine a flow-to-flow similarity further comprise machine readable instructions that when executed further cause the computer system to:

determine a textual similarity by determining a cosine similarity of word co-occurrence vectors of the virtual flow documents;

determine an intersection similarity by determining a number of intersection points divided by a length of union of the virtual flow documents;

determine a point similarity by determining a set similarity between the points in the virtual flow documents; and determine a control similarity by determining a set similarity between the controls in the virtual flow documents.

18. The non-transitory computer readable medium according to claim 16, wherein the machine readable instructions when executed further cause the computer system to:

determine a combined similarity between each pair of the virtual flow documents.

19. The non-transitory computer readable medium according to claim 16, wherein the machine readable instructions when executed further cause the computer system to:
  use the flow-to-flow similarity to generate highest priority virtual flow documents from the identified virtual flow documents and methods for the source code for the application.

20. The non-transitory computer readable medium according to claim 19, wherein the machine readable instructions to use the flow-to-flow similarity to generate the highest priority virtual flow documents and the methods for the source code for the application further comprise machine readable instructions that when executed further cause the computer system to:
  use the virtual flow documents to execute a longest common subsequence process to identify a longest common order of the method calls across the virtual flow documents present in a predetermined number of the virtual flow documents.

* * * * *